United States Patent
Harris et al.

[11] Patent Number: 5,829,620
[45] Date of Patent: Nov. 3, 1998

[54] QUICK-ON CAP WITH ONE-PART CLOSURE BODY

[75] Inventors: Robert S. Harris; Jeffery Griffin, both of Connersville, Ind.

[73] Assignee: Stant Manufacturing Inc., Connersville, Ind.

[21] Appl. No.: 760,198

[22] Filed: Dec. 4, 1996

Related U.S. Application Data

[60] Provisional application No. 60/007,946 Dec. 4, 1995.

[51] Int. Cl.⁶ ..................................................... B65D 51/16
[52] U.S. Cl. .................... 220/203.26; 220/295; 220/300; 220/303; 220/304; 220/375; 220/DIG. 33
[58] Field of Search ........................ 220/203.24, 203.26, 220/203.28, 293, 295, 296, 298, 299, 300, 303, 304, 375, DIG. 33

[56] References Cited

U.S. PATENT DOCUMENTS

| | | |
|---|---|---|
| 1,738,893 | 12/1929 | Grady . |
| 2,964,214 | 12/1960 | Stannard . |
| 2,990,971 | 7/1961 | Enell . |
| 3,111,239 | 11/1963 | Ivins . |
| 3,813,904 | 6/1974 | Wallskog . |
| 3,820,680 | 6/1974 | Friend . |
| 3,893,487 | 7/1975 | Engelking . |
| 3,938,692 | 2/1976 | Crute . |
| 3,985,260 | 10/1976 | Evans . |
| 4,000,633 | 1/1977 | Evans . |
| 4,102,472 | 7/1978 | Sloan, Jr. . |
| 4,162,021 | 7/1979 | Crute . |
| 4,294,376 | 10/1981 | Keller . |
| 4,339,055 | 7/1982 | Hutzenlaub . |
| 4,436,219 | 3/1984 | Reutter . |
| 4,498,493 | 2/1985 | Harris . |
| 4,540,103 | 9/1985 | Kasugai et al. . |
| 4,572,396 | 2/1986 | Kasugai et al. . |
| 4,676,390 | 6/1987 | Harris . |
| 4,678,097 | 7/1987 | Crute . |
| 4,726,488 | 2/1988 | Brown . |
| 4,765,505 | 8/1988 | Harris . |
| 4,779,755 | 10/1988 | Harris . |
| 4,795,053 | 1/1989 | Kasegai et al. . |
| 4,887,733 | 12/1989 | Harris . |
| 5,108,001 | 4/1992 | Harris . |
| 5,110,003 | 5/1992 | MacWilliams . |
| 5,269,431 | 12/1993 | Sakata et al. . |
| 5,279,439 | 1/1994 | Kasugai et al. ..................... 220/303 X |
| 5,361,924 | 11/1994 | Muller . |
| 5,381,919 | 1/1995 | Griffin et al. . |
| 5,385,256 | 1/1995 | Brown . |
| 5,395,004 | 3/1995 | Griffin et al. . |
| 5,480,055 | 1/1996 | Harris et al. . |
| 5,520,300 | 5/1996 | Griffin . |
| 5,529,201 | 6/1996 | Tallent et al. ........................... 220/298 |
| 5,540,347 | 7/1996 | Griffin . |

FOREIGN PATENT DOCUMENTS

| | | |
|---|---|---|
| 56-147868 | 3/1983 | Japan . |
| 1 420 252 | 1/1976 | United Kingdom . |

Primary Examiner—Stephen K. Cronin
Attorney, Agent, or Firm—Barnes & Thornburg

[57] ABSTRACT

A filler neck closure cap includes a closure body, a handle coupled to an axially outer flange of the closure body, and an O-ring sealing gasket carried on an axially inner end of the closure body. The cap further includes closure retainer apparatus appended to a middle portion of the closure body to lie in fixed immovable relation to the middle portion. The closure retainer apparatus is configured to engage the filler neck to block removal of the closure body from the filler neck upon installation of the cap in the filler neck.

29 Claims, 3 Drawing Sheets

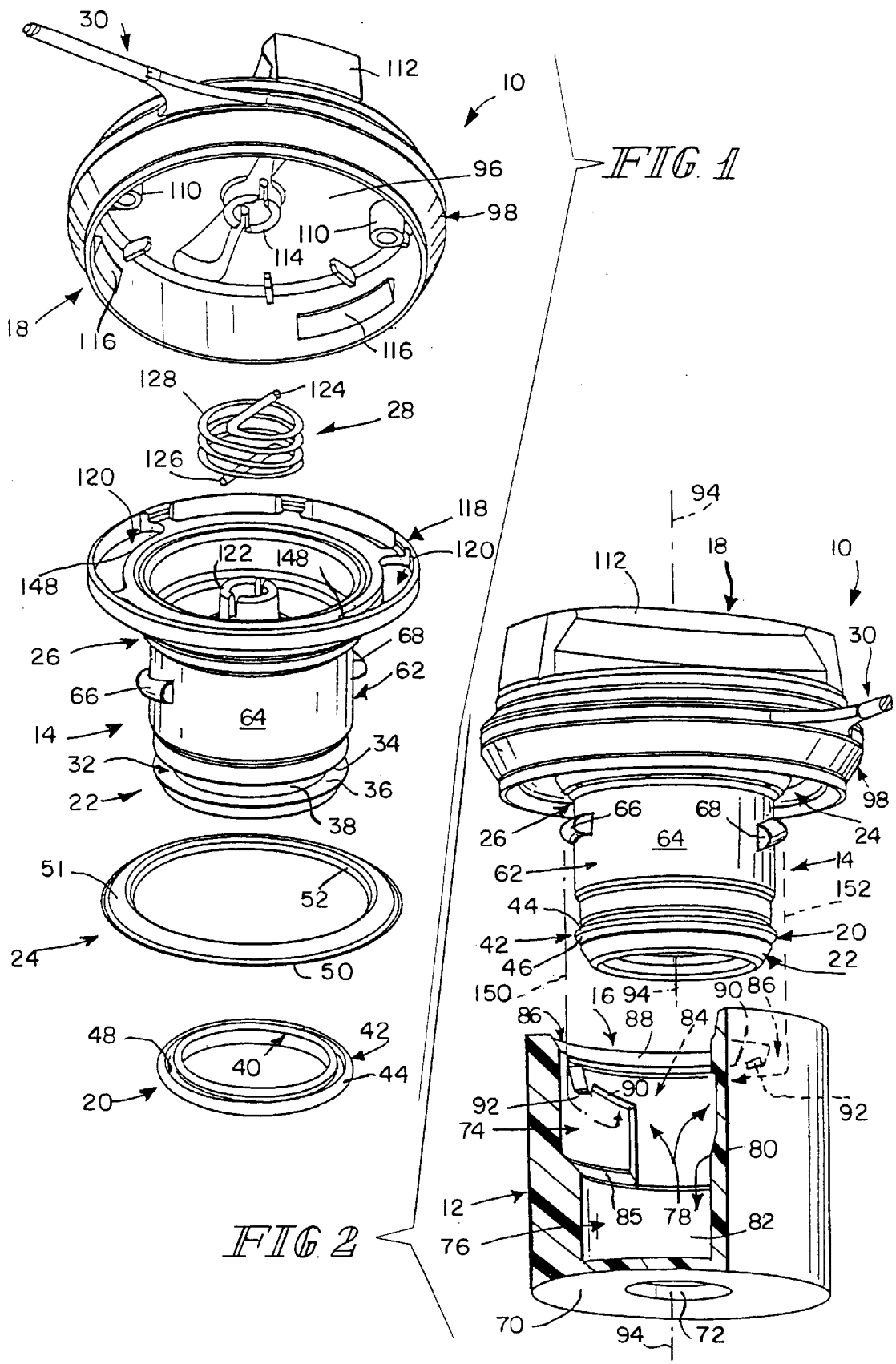

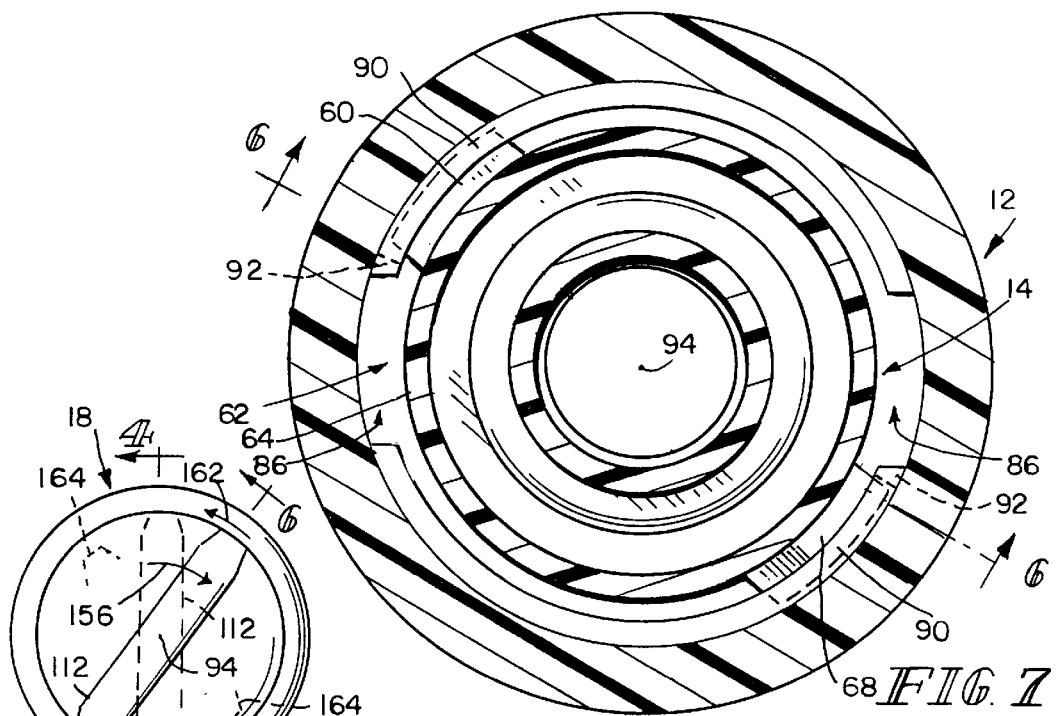
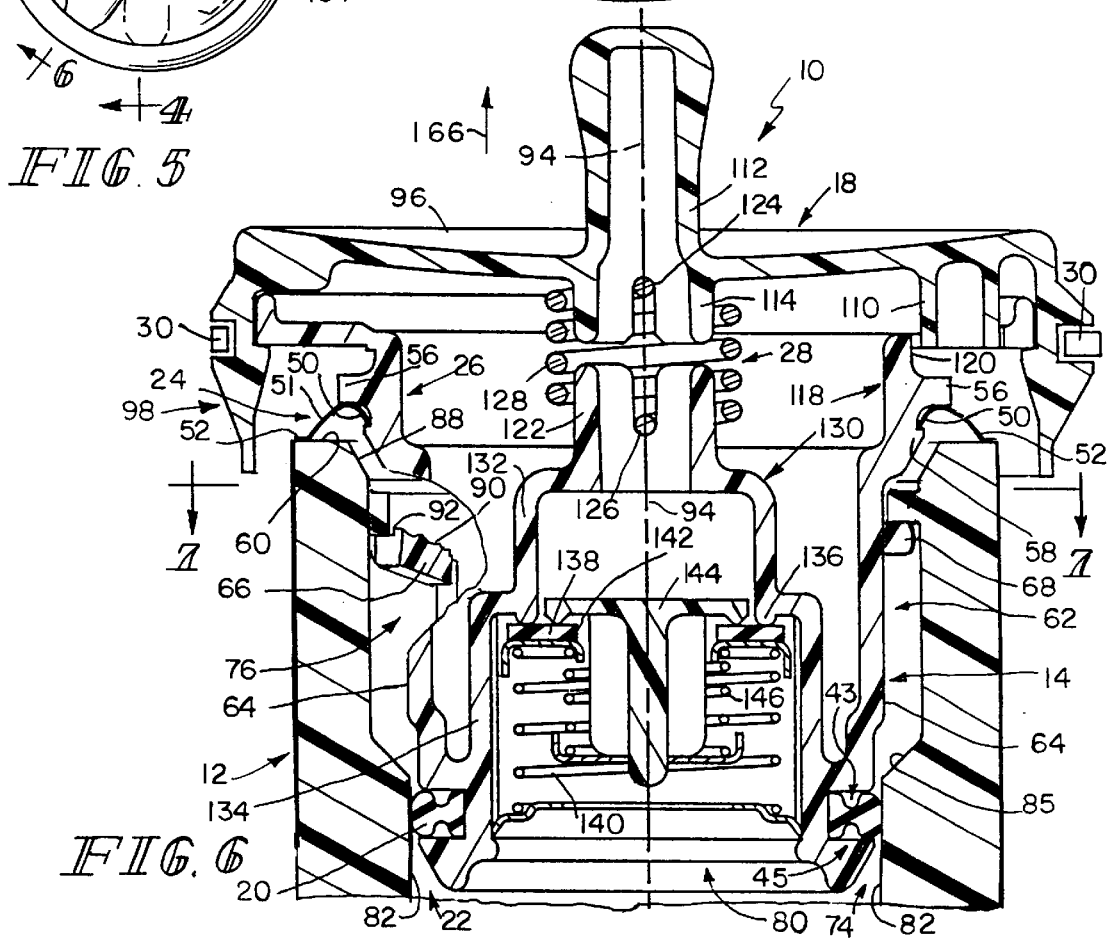

QUICK-ON CAP WITH ONE-PART CLOSURE BODY

BACKGROUND AND SUMMARY OF THE INVENTION

This is a continuation of U.S. Provisional Patent Application No. 60/007,946, filed Dec. 4, 1995.

The present invention relates to a cap for closing the mouth of a filler neck, and in particular, to a quick-on fuel cap for closing the filler neck of a vehicle fuel tank. More particularly, the present invention relates to a cap including an attachment mechanism for enabling a user to attach the cap to the filler neck quickly and easily and establish a sealed connection between the cap and the filler neck.

Conventional fuel caps for closing the filler neck of a vehicle fuel tank typically include a closure member for closing the mouth of the filler neck and a handle for turning the closure member to mount the closure member in the filler neck. Partial-turn cam-on caps and multiple-turn threaded caps are well-known types of caps for use in closing filler necks. Although such caps are currently in widespread use, it would be desirable to provide an alternative cap that is simpler to install on and remove from a filler neck.

It is known to provide a cam-on cap of the type having a shank portion which extends into the filler neck and is provided with pairs of conventional circumferentially spaced-apart cam lugs as disclosed in U.S. Pat. No. 4,887,733 to Harris. These cam lugs operate in the customary way to engage a filler neck configured to receive a cam-on cap and retain the cap in a fully tightened position closing the open mouth of the filler neck.

Alternatively, a conventional multiple-turn cap includes a closure member that is threaded to be screwed into a threaded filler neck. For example, U.S. Pat. No. 3,820,680 to Friend discloses a multiple-turn threaded cap and a compatible threaded filler neck. Typically, a multiple-turn threaded cap must be turned at least two and one-half or three full revolutions by the user after it is inserted into the threaded filler neck to connect the cap to the filler neck and establish a liquid and vapor seal between the cap and the filler neck.

More and more vehicle drivers are using the self-service bays at gasoline stations and filling their own fuel tanks. Some people have found that it is difficult to remove and install a conventional filler neck cap during refueling. A cap that is readily installable on and removable from a filler neck by a user without a lot of effort and that is configured to establish a sturdy sealed connection between the cap and the filler neck consistently during use would be a welcomed improvement over conventional caps.

It is known to provide a filler neck cap for which it is only necessary for the user to move the handle cover of the cap a small amount relative to the filler neck to tighten or loosen the cap during refueling. See, for example, U.S. Pat. Nos. 5,381,919 and 5,395,004 to Griffin et al. Typically these caps include a partial turn-to-remove feature which allows the user to slide the cap out of the filler neck easily rather than requiring the user to turn the entire cap in the filler neck one or more revolutions.

One problem with many conventional filler neck caps is that, because the handle is directly connected to the filler neck closure, any unintentional movement of the handle in the cap-removal direction will break the seal between the closure and the filler neck. Once the seal between the closure and the filler neck is broken, it is possible for fuel or fuel vapor to escape from the filler neck. In some instances, such as during a vehicle accident, a release of fuel or fuel vapor can potentially create a hazardous condition.

It is known to provide a filler neck cap having a lost-motion driving connection between the handle and the closure. See, for example, U.S. Pat. Nos. 4,765,505 to Harris and 5,520,300 to Griffin. These caps are designed to allow the cap handle to rotate freely relative to the closure in both the cap-installation direction and the cap-removal direction.

In some cases, a user might be inconvenienced by a cap that provides a lost-motion driving connection during cap installation as well as during cap removal. It is known to provide a filler neck cap having a lost-motion driving connection between the handle and the closure during cap removal and that is automatically set to have a direct-drive driving connection between the handle and closure during cap installation. See, for example, U.S. Pat. No. 5,480,055 to Harris and Griffin.

Filler neck caps that include a sealing mechanism for establishing a liquid fuel and vapor seal between the filler neck and the sealing mechanism are often configured to ensure that the seal remains intact in the event of trauma such as an impact that might result if the vehicle is involved in a collision. See, for example, U.S. Pat. No. 4,678,097 to Crute disclosing a fuel cap including a flange having a frangible section that allows the handle shell to separate from the closure and sealing ring so that the seal remains intact in the event of such an impact. See also U.S. Pat. No. 5,381,919 to Griffin et al. disclosing a seal ring positioned at an axially inner surface on the closure engaging an axially outwardly-facing sealing surface of the filler neck so that the seal is axially compressed therebetween forming the seal at a position axially within the filler neck.

What is needed is a fuel cap providing a quick-on installation and removal mechanism allowing the user to move the handle a minimum angular distance to tighten or loosen the cap during refueling. Users will appreciate a quick-on fuel cap configured to include a minimum number of parts and also to resist wear of a sealing gasket included in the cap during normal use and disruption (e.g., premature unsealing) of the sealing gasket in the event of vehicle collision.

According to the present invention, a cap is provided for uses in the filler neck of a tank. The cap includes a closure body, an O-ring sealing gasket on the closure body, and a handle for turning the closure body relative to the filler neck. The closure body includes an axially outer flange coupled to the handle and an axially inner end carrying the O-ring sealing gasket. The closure body further includes a middle portion positioned to lie between the axially outer flange and the axially inner end and closure retainer apparatus appended to the middle portion. The closure retainer apparatus is configured to engage the filler neck to block removal of the closure body from the filler neck upon installation of the cap in the filler neck.

In preferred embodiments, the middle portion is integrally appended to each of the axially outer flange and the axially inner end to establish a "one-piece" closure body of the cap. The closure apparatus includes a pair of helical retaining lugs appended to a cylindrical exterior side wall of the middle portion and positioned to lie in circumferentially spaced-apart relation one to another.

The axially inner end of the closure body is formed to include an annular channel containing the O-ring sealing gasket and lying in axially spaced-apart relation to the overlying pair of helical retaining lugs appended to the middle portion. The O-ring sealing gasket is positioned to slidingly engage the filler neck as the closure body is moved into the filler neck with minimum rotation of the sealing gasket during installation to minimize abrasion of the sealing gasket.

The cap is anchored to the filler neck by closure retainer apparatus that is appended to the middle portion of the closure body and positioned to lie between the handle and the O-ring sealing gasket. This arrangement allows the sealing gasket to be placed axially inwardly a predetermined distance into the filler neck and away from the mouth of the filler neck to minimize disruption of the seal that might occur in the event of a vehicle collision or undesirable impact to a portion of the vehicle adjacent to the filler neck.

During cap installation, the user always turns the closure body in the filler neck in a cap-installation or cap-advancing direction directly by turning the handle about its axis of rotation. The cap is called a "quick-on" cap because a user need only turn the handle a fraction of a turn in a clockwise direction once the cap is inserted into the filler neck to anchor the cap in a sealed filler neck closing position. During cap removal, the user turns the closure body in the filler neck in an opposite cap-removal direction.

The filler neck is formed to receive and engage the closure retainer apparatus appended to the middle portion of the closure body. The filler neck is also formed to engage the O-ring sealing gasket to establish a sealed connection between the cap and the filler neck at a point below the point at which the closure retainer apparatus engages the filler neck.

Additional features and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which:

FIG. 1 is an exploded perspective view of a preferred embodiment of a quick-on cap in accordance with the present invention showing a closure body for closing an open mouth of a filler neck, an O-ring sealing gasket for mounting on an axially inner end of the closure body, a dust shield ring (located between the closure body and the O-ring sealing gasket) for mounting on a middle portion of the closure body in a position above the O-ring sealing gasket and for blocking passage of dust into a filler neck once the closure body is installed in the filler neck, a handle cover including two downwardly extending cylindrical drive lugs arranged to extend into two spaced-apart annular lost-motion drive slots formed in an axially outer face of the closure body upon connection of the handle cover to the underlying closure body, a torsion spring for interconnecting the handle cover and the closure body and yieldably rotating the closure body to provide a direct-drive driving connection between the handle cover and the closure body during rotation of the handle cover in a cap-installation direction and allow a certain amount of lost motion between the handle cover and the closure body during initial rotation of the handle cover in a cap-removal direction;

FIG. 2 is a perspective view of the quick-on cap of FIG. 1 (after it has been assembled) as it is about to be inserted into a filler neck provided with two vertical lug-receiving channels and an internal mounting flange adjacent to each channel and showing the paths (dotted lines) to be taken by two spaced-apart helical retaining lugs appended to the closure body during insertion of the closure body into the filler neck and subsequent rotation of the closure body relative to the filler neck to move the retaining lugs out of the channels and into engagement with the internal mounting flanges;

FIG. 5 is a plan view of the quick-on cap of FIG. 4 showing clockwise rotation of the handle cover in the cap-installation direction from the partly installed first-stage position (full dotted lines) through a 30° angle with the underlying closure body to a fully installed second-stage position (solid lines) shown in FIG. 6;

FIG. 6 is a sectional view of the quick-on cap of FIG. 4 taken along line 6—6 of FIG. 5 in its fully installed second-stage position wherein the O-ring sealing gasket is radially compressed to sealingly engage the reduced diameter portion of the fill passageway formed in the filler neck, the two helical retaining lugs underlie and engage two internal mounting flanges formed in the filler neck, and the dust shield ring is trapped between a flange on the closure body and an outer edge of the filler neck to block entry of dust into the filler neck mouth; and FIG. 7 is a transverse sectional view of the quick-on cap and filler neck taken along line 7—7 of FIG. 6 showing the position of the two helical retaining lugs in angled spaced relation to the two vertical lug-receiving channels formed in the filler neck and in engagement with the two internal mounting flanges formed in the filler neck.

DETAILED DESCRIPTION OF THE DRAWINGS

Figure 3:
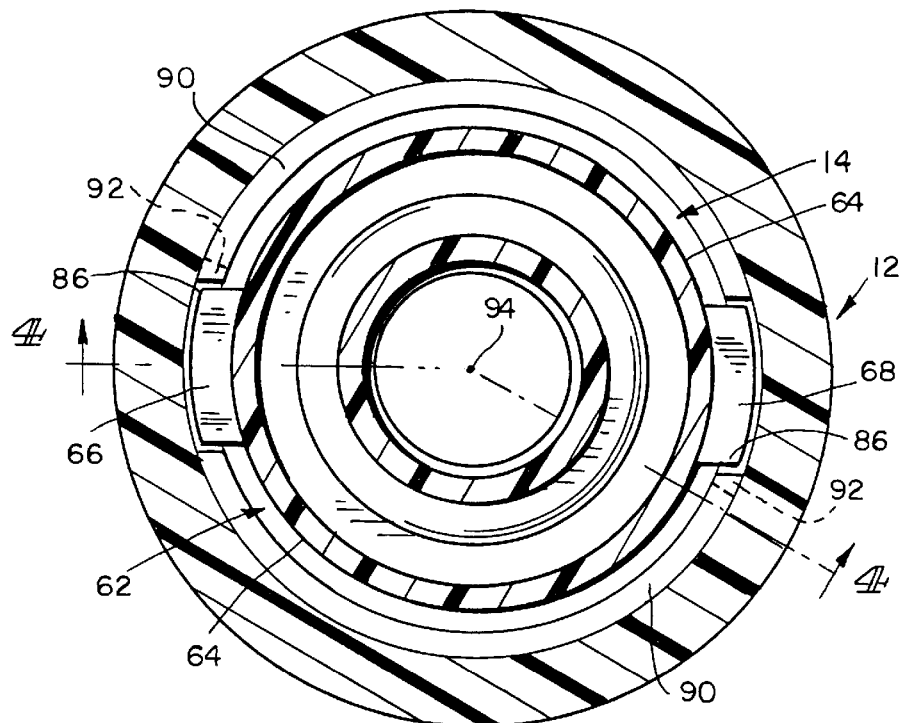
FIG. 3 is a section taken along line 3—3 of FIG. 4 through the filler neck of FIG. 2 following "drop-in" insertion of the quick-on cap of FIG. 2 along a vertical axis into the filler neck and showing placement of the two spaced-apart helical retaining lugs on the closure body into two matching spaced-apart vertical lug-receiving channels formed in an interior side wall of the filler neck to block rotation of the closure body about the vertical axis relative to the filler neck during initial insertion of the quick-on cap in the filler neck.

A quick-on cap 10 in accordance with the present invention can be installed on a compatible filler neck 12 by inserting a closure body 14 of the cap 10 into the mouth 16 of a filler neck 12 and turning a handle cover 18 of the cap 10 30° in a clockwise cap-advancing direction. To remove the cap 10, the handle cover 18 is rotated through a 60° first lost-motion stage angle relative to the mounted sealed closure body 14 in a counterclockwise cap-removal direction and then the handle cover 18 and closure body 14 are rotated together as a unit through a 30° second direct-drive stage angle relative to the filler neck 12 also in a counterclockwise cap-removal direction. Once removed from the filler neck 12, cap 10 automatically resets itself in the manner described below so that a direct-drive driving connection is established between the handle cover 18 and the closure body 14 during cap installation.

Referring to FIG. 1, quick-on cap 10 includes closure body 14, handle cover 18, an O-ring sealing gasket 20 for mounting on an axially inner end 22 of closure body 14, a dust shield ring 24 for mounting on a middle portion 26 of closure body 14, a torsion spring 28 for interconnecting closure body 14 and handle cover 18, and a cap tether 30.

Closure body 14 is formed to include an annular channel 32 in the axially inner end 22 for receiving the O-ring sealing gasket 20 therein. Closure body 14 includes a circular top wall 34, a spaced-apart circular bottom wall 36, and a circular side wall 38 extending between top wall 34 and bottom wall 36, and these walls 34, 36, 38 cooperate to define annular channel 32.

Figure 4:
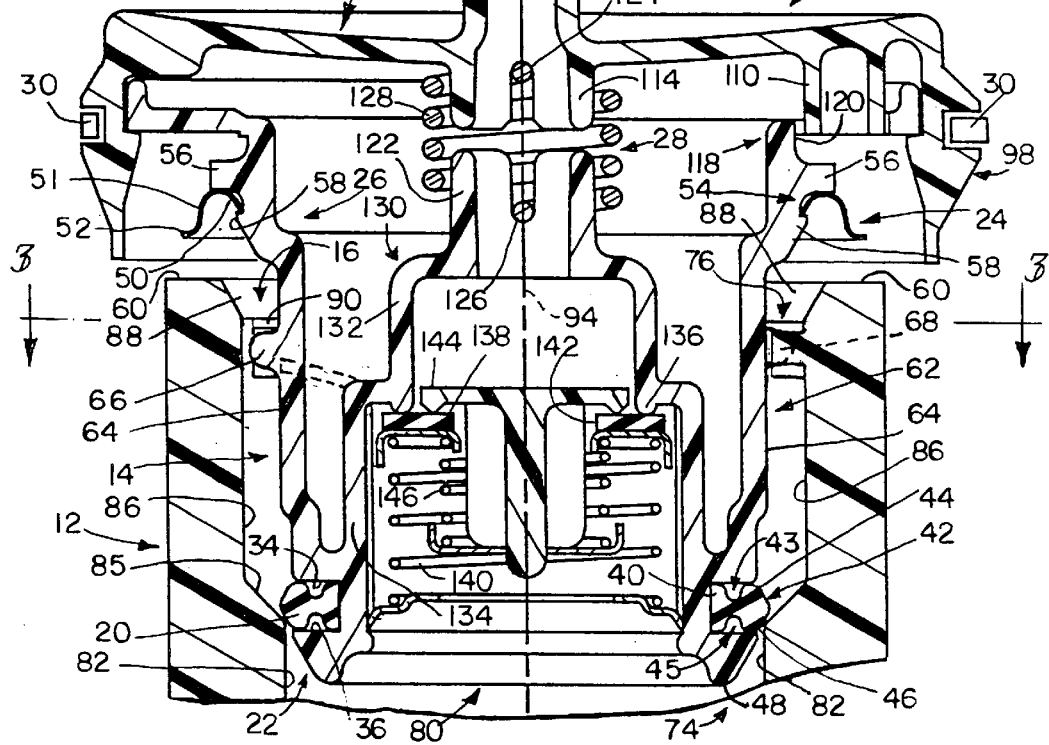
FIG. 4 is a sectional view of the quick-on cap and filler neck taken along line 4—4 of FIG. 3 as the quick-on cap is being inserted into the filler neck and moved towards a partly installed first-stage position and showing the location of the O-ring sealing gasket just before it reaches its partly installed first-stage position at which the O-ring sealing gasket will engage a reduced inner diameter portion of a fill passageway formed in the filler neck, the location of the "left-side" helical retaining lug on the closure body in the "left-side" vertical lug-receiving channel in the filler neck and the "right-side" helical retaining lug in the "right-side" vertical lug-receiving channel, and the location of the dust shield ring on the closure body inside the handle cover and above the axially outer end of the filler neck.

Referring to FIGS. 1, 2, and 4, O-ring sealing gasket 20 includes an inner ring 40 sized to fit snugly and sealingly in annular channel 32 to establish a seal between one or more of walls 34, 36, 38. Gasket 20 also includes an outer ring 42 having an arrowhead-like cross-sectional shape as shown in FIGS. 2 and 4 and an inclined top annular surface 44 and an inclined bottom annular surface 46. Gasket 20 further includes a thin annular membrane 48 interconnecting inner and outer rings 40, 42. As shown best in FIG. 4, thin annular membrane 48 interconnects inner and outer rings 40, 42 to define an axially upwardly facing U-shaped channel 43 between inner and outer rings 40, 42 and above thin annular membrane 48 and an axially downwardly facing U-shaped annular channel 45 between inner and outer rings 40, 42 and below thin annular membrane 48.

Dust shield ring 24 includes a radially inner annular mounting portion 50 and a radially outer annular closure portion 52 as shown, for example, in FIGS. 1 and 4. Mounting portion 50 is installed in an annular channel 54 formed in middle portion 26 between two annular flanges 56, 58. Closure portion 52 is configured to mate with an axially outer portion 60 of filler neck 12 upon installation of cap 10 in filler neck 12 as shown, for example, in FIG. 6. Dust shield ring 24 also includes an annular section 51 having a curved cross section interconnecting and lying between mounting portion 50 and closure portion 52 as shown, for example, in FIGS. 1, 4, and 6. Dust shield ring 24 is made of an elastic material such as spring steel so that it can be elastically compressed between flange 56 on closure body 14 and axially outer end 60 on filler neck 12 as shown in FIG. 6.

Closure body 14 includes a cylindrical base portion 62 extending between annular flange 58 and annular channel 32 as shown for example, in FIGS. 1, 2, and 4. Base portion 62 includes an exterior surface 64 and closure retainer apparatus provided by a pair of radially outwardly projecting retaining lugs 66, 68. As shown, for example in FIGS. 2, 4, and 6, retaining lugs 66, 68 function to draw cap 10 into filler neck 12 during cap installation and retain cap 10 in an installed position in filler neck 12. Illustratively, cap 10 includes two circumferentially spaced-apart helical annular retaining lugs 66, 68. Alternatively, a cap in accordance with the invention could include one or more non-helical retaining lug segments appended to cap 10 and configured to engage filler neck 12. For example, three or more circumferentially spaced-apart lugs could be used and lugs that extend in non-helical fashion (i.e., lie in a single plane transverse to a central, vertical, longitudinal axis of rotation extending through the closure body) about exterior surface 64 of closure body 14 could be used. Of course, such non-helical lugs (not shown) would not function to draw cap 10 further into filler neck 12 during cap installation and instead would provide only closure body guiding and retaining functions.

Filler neck 12 is shown in detail in FIG. 2. Filler neck 12 is a molded plastic insert that is designed to be installed in an outermost end of a fuel tank fill tube (not shown). Means such as matching threads, mounting flanges, and/or other fasteners (not shown) can be used to fix filler neck 12 in place in such a fuel tank fill tube (not shown). A partition wall 70 is formed in filler neck 12 to include an aperture 72 sized to receive an unleaded fuel-dispensing nozzle (not shown) of the type used to pump fuel into a fill tube as shown in FIG. 2.

As shown, for example, in FIGS. 2, 4, and 6, filler neck 12 includes a lower interior region 74 that is configured to establish a tight seal with O-ring sealing gasket 20 upon installation of cap 10 in a fully installed position in filler neck 12. Filler neck 14 also includes an upper interior region 76 that is formed to include means 78 for receiving, guiding, and retaining the retaining lugs 66, 68 on closure body 14 so that cap 10 is retained in its fully installed position in filler neck 12.

Lower interior region 74 of filler neck 12 includes a reduced internal diameter fill passageway 80 defined by cylindrical interior wall 82. Cylindrical interior wall 82 has an internal diameter sized to cause a tight annular seal to be established between wall 82 and O-ring sealing gasket 20 upon insertion of the axially inner end 22 of closure body 12 carrying gasket 20 into the fill passageway 80 formed in lower interior region 74 of filler neck 12.

Upper interior region 76 of filler neck 12 includes an annular side wall 84 that is formed to include internal flanges that define slots for receiving and guiding the two retaining lugs 66, 68 that are appended to closure body 14. A conical necked-down interior wall 85 interconnects larger diameter annular side wall 84 to smaller diameter annular side wall 82. A vertical (i.e., axially extending) lug-receiving slot 86 is provided for receiving each of the retaining lugs 66, 68 as the quick-on cap 10 is thrust into a cap-receiving aperture 88 formed at the axially outer end of filler neck 12. A mounting flange 90 is provided to engage each retaining lug 66, 68 and block removal of closure body 14 from filler neck 12 through cap-receiving aperture 88. Alternatively, annular side wall 84 could be formed to include a pair of helical slots (not shown) having an upper edge defined by lug 92 and mounting flange 90 and sized to receive helical retaining lugs 66, 68 therein. An anti-rotation lug 92 is provided on or adjacent to each mounting flange 90 to block rotation of retaining lugs 66, 68 from a fully installed position engaging mounting flanges 90 to a partly installed position lying in the vertical lug-receiving slots 86.

Once the cap 10 has been inserted into filler neck 12 and moved axially inwardly so that retaining lugs 66, 68 lie in vertical lug-receiving slots 86 and O-ring sealing gasket 10 engages the interior wall 82 defining fill passageway 80, the cap 10 is in a first-stage loosened position and is ready to be tightened. A user simply needs to rotate handle cover 12 about central axis 94 a fraction of a turn (e.g., 30°, one-twelfth of a revolution). Rotation of handle cover 12 causes closure body 14 to rotate relative to filler neck 12 so that the two helical retaining lugs appended to closure body 14 rotate into engagement with the axially inwardly facing side of mounting flanges 90 to block axial removal of cap 10 from filler neck 12.

As shown best in FIG. 1, handle cover 18 includes a circular top wall 96, an annular perimeter side wall 98, a spaced-apart pair of axially inwardly projecting, cylindrical drive lugs 110, a hollow grip handle 112, a spring mount 114, and a plurality of retention flanges 116. Closure body 14 includes an axially outer flange 118 sized to fit into the interior region of handle cover 18 and formed to include a pair of circumferentially spaced-apart annular lost-motion drive slots 120. These slots 120 are positioned so that each slot 120 receives one of the downwardly extending drive lugs 110 therein upon assembled of handle cover 18 onto closure body 14. Illustratively, each slot 120 is an arc about axis 94 subtending a central angel of 60°. Closure body 14 also includes a spring mount 122 projecting upwardly (as shown in FIGS. 1, 4, and 6) toward the downwardly projecting spring mount 114 appended to handle cover 18. Torsion spring 28 includes one end 124 coupled to spring mount 114 and another end 126 coupled to spring mount 122, and a coiled portion 128 between ends 124, 126 as shown in FIGS. 4 and 6.

As shown in FIGS. 4 and 6, closure body 14 includes an inner shell 130 having a lower end 132 coupled to axially inner end 22 and an upper end 134 carrying spring mount 122. Inner shell 130 contains apparatus for relieving excess pressure and vacuum in a fuel tank (not shown) coupled to fill passageway 80 in filler neck 12. Inner shell 130 includes annular valve seat 136, an annular pressure-relief valve 138 biased by spring 140 normally to engage annular valve seat 136 and formed to include a control aperture 142, a vacuum-relief valve 144, and a spring 146 for biasing vacuum-relief valve 144 normally into sealing engagement with a top side of annular pressure-relief valve 138.

Quick-on cap 10 is automatically set to have a direct-drive driving connection between handle cover 18 and closure body 14 during cap installation and to have a lost-motion driving connection between the handle cover 18 and closure body 14 during cap removal. Such a cap 10 is easy to install yet incorporates a lost-motion feature that functions to prevent loss of cap seal if the handle cover 18 is rotated inadvertently in a cap-removal direction during vehicle impact or during stress relief of vehicle components.

During cap installation, the user always turns the closure body 14 in the filler neck 12 in a cap-installation or cap-advancing direction directly by turning the handle cover 18 about its axis of rotation 94. The cap 10 is called a "quick-on" cap because a user need only turn the handle cover 18 one-twelfth of a turn (30°) in a clockwise direction once the cap 10 is inserted into the filler neck 12 to anchor the cap 10 in a sealed filler neck-closing position shown in FIG. 6.

Each time the quick-on cap 10 is removed from filler neck 12, it instantly and automatically "resets" itself so that a direct-drive driving connection between the handle cover 18 and the closure body 14 is established to facilitate reinstallation of the quick-on cap 10 on the filler neck 12. This reset function is achieved by automatic operation of the torsion spring 28 to rotate the closure body 14 relative to the handle cover 18.

Upon removal of the cap 10 from filler neck 12, while the user is still gripping the cap 10 by holding onto the handle cover 18, the torsion spring 28 inside the cap 10 functions to rotate the closure body 14 about the axis of rotation 94 relative to the handle cover 18 until the drive lugs 110 on the handle cover engages drive walls 148 in the drive slots 120 formed in the closure body 14. This lug-to-wall engagement establishes a direct-drive driving connection between the handle cover 18 and the closure body 14 for use during cap installation. In other words, the torsion spring 28 applies a spring force which biases the drive lugs 110 against the drive walls 148 to establish a direct-drive driving connection automatically before and during each cap installation. One benefit to the user of such a direct-drive feature is that any rotation of the handle cover 18 in a cap-advancing direction by the user during cap installation will cause the closure body 14 to turn in the filler neck 12 so that the user can positively and quickly install the quick-on cap in the filler neck 12 without any "lost motion" between the handle cover 18 and the closure body 14.

Advantageously, the torsion spring 28 provides a direct-drive driving connection before and during cap installation without disrupting a lost-motion driving connection that is established between the handle cover 18 and closure body 14 during an initial stage of cap removal. O-ring sealing gasket 20 is mounted on the closure body 14 and trapped between the closure body 14 and the filler neck 12 upon rotation of the closure body 14 to its tightened filler neck-closing position shown in FIG. 6. When the handle cover 18 is initially rotated by a user in a counterclockwise cap-removal direction, the handle cover 18 is permitted to rotate through a predetermined "lost motion" angle, e.g., 60°, relative to the closure body 14 before establishing a direct-drive driving connection therewith to delay breaking a seal between the closure body 14 and the filler neck 12. Once the direct-drive driving connection is established, further counterclockwise rotation of the handle cover will cause the closure body 14 to rotate in the filler neck 12 from its sealed filler neck-closing position to an unsealed position. This "lost motion" feature advantageously aids in increasing the crashworthiness of the quick-on cap 10 by lessening the likelihood that the cap 10 will loosen an amount sufficient to break the seal during an accidental impact.

During cap removal, the user begins to turn the handle cover 18 in a counterclockwise direction relative to the filler neck 12 against the biasing force generated by the torsion spring 28. Even though the user is turning the spring-loaded handle cover 18 about its axis of rotation 94, the closure body 14 remains fixed in its sealed filler neck-closing position due to the lost-motion driving connection between the handle cover 18 and the closure body 14. Once the handle cover 18 is rotated in a cap-removal direction through a predetermined lost-motion angle, e.g., 60°, the drive lugs 110 on the underside of the handle cover 18 are moved into engagement with the drive walls 148 on the top side of the closure body 14. From this point on, a direct-drive driving connection is established and continued rotation of the handle cover 18 in a cap-removal direction causes rotation of the closure body 14 relative to the filler neck 12 in a cap-removal direction until the seal between the closure body 14 and the filler neck 12 is broken and later the cap 10 is finally separated from the filler neck 12. It is only necessary to rotate the handle cover 18 another one-twelfth of a turn, e.g., 30°, in the counterclockwise cap-removal direction to disengage the closure body 14 from the filler neck 12 so that the cap 10 can be removed to permit vehicle refueling.

The torsion spring 28 functions to rotate the closure body 14 relative to the handle cover 18 automatically after removal of the cap 10 from the filler neck 12 so that a lost-motion driving connection is not present and apparent to a user during installation of the cap 10 in the filler neck 12. Thus, a direct-drive driving connection between the handle cover 19 and closure body is automatically established during cap installation without disabling a lost-motion driving connection that is always established between the handle cover 18 and closure body 14 during an initial stage of cap removal.

A sequence of movement to cause quick-on cap 10 to be fully installed in filler neck 12 is summarized below with reference to FIGS. 2–6. Referring to FIG. 2, quick-on cap 10 is first positioned above cap-receiving aperture 88 formed in filler neck 10 and is oriented so that it extends along axis 94. In this position, retaining lugs 66, 68 are positioned directly above openings into the pair of spaced-apart vertical lug-receiving slots 86 formed in the upper interior region 76 of filler neck 12. A pair of dotted-line paths 150 and 152 are illustrated in FIG. 2 to show the path that each of the retaining lugs 66, 68 will follow during installation of quick-on cap 10 into filler neck 12.

During an initial stage of the installation of quick-on cap 10 into filler neck 12, closure body 14 is moved along axis 94 and inserted into upper interior region 76 of closure body 14 as shown in FIG. 4 so that O-ring sealing gasket 20 is positioned adjacent to necked-down conical wall 85 and just above the reduced-diameter interior wall 82 defining fill passageway 80. At this point, O-ring sealing gasket 32 has not been radially compressed to establish a seal between filler neck 12 and closure body 14. Also at this stage, the retaining lugs 66, 68 have been moved into the vertical lug-receiving slots 86 formed in filler neck 12 as shown, for example, in FIGS. 3 and 4. It is only necessary for a user to push quick-on cap 10 a little bit further in inward direction 154 (FIG. 4) to cause O-ring sealing gasket 20 to be radially compressed and lodged between radially inwardly facing interior wall 82 of closure body 14 and circular side wall 38 in annular channel 32 of closure body 14 to establish a tight leakproof seal therebetween. O-ring sealing gasket 32 has a cross section as shown, for example, in FIG. 4, that allows gasket 20 to be radially compressed to the position shown in FIG. 6.

Referring now to FIG. 5, it will be understood that hollow grip handle 112 on handle cover 18 occupies the position shown in full dotted line in FIG. 5 during partial installation of quick-on cap 10 in filler neck 12 to the position shown in FIGS. 3 and 4. It is shown in FIG. 5 that it is only necessary for a user to rotate handle cover 18 in direction 156 through an angle of about 30° to cause quick-on cap 10 to be rotated to its fully installed position shown in FIGS. 6 and 7. This is because a direct-drive driving connection of the type described above is established between handle cover 18 and closure body 14 during rotation of handle cover 18 in cap-advancing direction 156.

Once fully installed, quick-on cap 10 is positioned as shown in FIGS. 6 and 7 so that O-ring sealing gasket 20 establishes a fluid-tight seal with interior wall 82 of filler neck 12 and retaining lugs 66, 68 are trapped into engagement with mounting flanges 90 by anti-rotation lugs 92. At this stage, venting of a fuel tank connected to fuel passageway 80 is controlled by the pressure-relief and vacuum-relief assembly mounted inside inner shell 130 provided in closure body 14. Also, annular dust shield 24 is compressed to the position shown in FIG. 6 to block admission of unwanted dust or other particulate matter into upper interior region 76 of filler neck 12.

Quick-on cap 10 can be removed easily by a user from its fully installed position in filler necks 12. Referring to FIG. 5, it is only necessary for a user to rotate hollow grip handle 112 from the solid-line position shown in FIG. 5 through a lost-motion angle of 60° in direction 162 to the abbreviated dotted-line 164 shown in FIG. 5. At this point, driving engagement is established between drive lugs 110 on handle cover 18 and drive walls 148 on closure body 14 so that continued rotation of handle cover 18 in direction 162 by a user will cause retaining lugs 66, 68 to be released from engagement with mounting flanges 90 and moved into the vertical lug-receiving slots 86 formed in the upper interior region 76 of filler neck 12. At this point, it is only necessary for the user to pull quick-on cap 10 axially out of filler neck 12 in direction 166 (FIG. 6). As noted previously, once retaining lugs 66, 68 on closure body 14 are removed from engagement in vertical like-receiving slots 86 formed in filler neck 12, torsion spring 28 will act automatically to rotate closure body 14 back in direction 156 so that it is "reset" at its full dotted-line position shown in FIG. 5.

A cross section of the O-ring 20 is shown in FIG. 4. One important feature of this cap design is that the seal ring 20 is configured to provide a true radial seal with a filler neck 12. This radial seal must be maintained with a minimum of radial force so that friction is minimized when the cap 10 is rotated in filler neck 12. The design features an inner band 40 which is snapped over the closure body 14 into a circumferential groove 34 to maintain a closure body-to-seal ring seal. An outer band 44 contains a narrow face for low friction while maintaining seal between the band and the filler neck. Hoop compression of the band provides the majority of radial force to cause sealing between the ring 20 and neck 12.

The seal ring 20 is designed to be compressed in a way to make it stronger structurally during cap-loading and resist cap-loading deflection, and resulting leakage during various vehicle impacts, while maintaining low install and remove torques. The seal ring design disclosed herein uses a radial-type seal positioned low in the filler neck and away from the cap-to-neck outer interface area.

Axial tension to keep retaining lugs 66, 68 in engagement with mounting flanges 90 formed in the upper interior region 74 of filler neck 12 is provided by a metal (stainless steel) diaphragm spring as shown in the figures. This spring also provides double duty as a dust shield ring to prevent dust intrusion into the neck cavity in the filler neck above the radial seal. The radial seal consists of an inner tension band which retains the seal to the cap and prevents leakage at the cap side of the seal. The outer portion of the seal is a heavy wall cross section which is placed in hoop compression when installed in the neck. The inner and outer portions are connected by a thin wall connector. This allows the outer section to compress on installation in the neck as well as permitting some relative rotation between the inner and outer sections during installation/removal to lower efforts since the cap rotates relative to the neck.

Although this invention has been described in detail with reference to certain embodiments, variations and modifications exist within the scope and spirit of the invention as described and as defined in the following claims.

We claim:

1. A cap for use in the filler neck of a tank, the cap comprising a handle, an O-ring sealing gasket, and a closure body including an axially outer flange coupled to the handle, an axially inner end carrying the O-ring sealing gasket, a middle portion positioned to lie between the axially outer flange and the axially inner end, and closure retainer apparatus appended to the middle portion to lie in fixed immovable relation to the middle portion and configured to engage the filler neck to block removal of the closure body from the filler neck upon installation of the cap in the filler neck.

2. The cap of claim 1, wherein the axially inner end is formed to include an annular channel lying in axially spaced-apart relation to the closure retainer apparatus and the O-ring sealing gasket is positioned to lie in the annular channel.

3. The cap of claim 2, further comprising a dust shield ring coupled to the closure body and positioned to lie between the handle and the closure retainer apparatus and in axially spaced-apart relation to the annular channel containing the O-ring sealing gasket.

4. The cap of claim 2, wherein the O-ring sealing gasket includes an inner ring fixed in the annular channel, an outer ring positioned to extend out of the annular channel, and a thin annular membrane interconnecting the inner and outer rings to define an axially upwardly facing U-shaped annular channel between the inner and outer rings and above the thin annular membrane and an axially downwardly facing U-shaped annular channel between the inner and outer rings and below the thin annular membrane.

5. The cap of claim 4, wherein the outer ring has an arrowhead-like cross-sectional shape, an inclined top annular surface, and an inclined bottom annular surface.

6. The cap of claim 1, wherein the middle portion is integrally appended to each of the axially outer flange and the axially inner end.

7. The cap of claim 6, wherein the closure body further includes an inner shell having a lower end coupled to the axially inner end and an upper end carrying a spring mount and the middle portion is formed to include an interior region containing the inner shell, and further comprising a torsion spring coupled to the handle and to the spring mount carried on the upper end of the inner shell.

8. The cap of claim 6, further comprising a dust shield ring, the middle portion including an axially upper section positioned to lie between the axially outer flange and the closure retainer apparatus, the dust shield being coupled to the axially upper section of the middle portion.

9. The cap of claim 8, wherein the axially upper section is formed to include an annular channel and the dust shield ring includes a radially inner mounting portion positioned to lie in the annular channel and a radially outer annular closure portion around the radially inner mounting portion.

10. The cap of claim 6, wherein the closure retainer apparatus includes a pair of retaining lugs integrally appended to the middle portion.

11. The cap of claim 10, wherein each of the retaining lugs is a helical annular member.

12. The cap of claim 10, wherein the middle portion includes a cylindrical exterior side wall and the retaining lugs are circumferentially spaced apart about the cylindrical exterior side wall of the middle portion.

13. The cap of claim 10, wherein the axially inner end is formed to include an annular channel lying in axially spaced-apart relation to the pair of retaining lugs and the O-ring sealing gasket is positioned to lie in the annular channel.

14. A cap for use in the filler neck of a tank, the cap comprising
a handle,
an O-ring sealing gasket,
a closure body including an axially outer flange coupled to the handle an axially inner end carrying the O-ring sealing gasket, a middle portion positioned to lie between the axially outer flange and the axially inner end, and closure retainer apparatus appended to the middle portion and configured to engage the filler neck to block removal of the closure body from the filler neck upon installation of the cap in the filler neck, and
a dust shield ring, the middle portion including an axially upper section positioned to lie between the axially outer flange and the closure retainer apparatus, the dust shield being coupled to the axially upper section of the middle portion.

15. The cap of claim 14, wherein the axially upper section is formed to include an annular channel and the dust shield ring includes a radially inner mounting portion positioned to lie in the annular channel and a radially outer annular closure portion around the radially inner mounting portion.

16. The cap of claim 15, wherein the axially upper section is formed to include a first annular flange and a second annular flange, the second annular flange is positioned to lie between the axially outer flange and the first annular flange, and the second annular flange is positioned to lie in axially spaced-apart relation to the first annular flange to define the annular channel therebetween.

17. A cap for use in the filler neck of a tank, the cap comprising
a handle,
an O-ring sealing gasket,
a closure body including an axially outer flange coupled to the handle, an axially inner end carrying the O-ring sealing gasket, a middle portion positioned to lie between the axially outer flange and the axially inner end, and closure retainer apparatus appended to the middle portion and configured to engage the filler neck to block removal of the closure body from the filler neck upon installation of the cap in the filler neck the closure body further including an inner shell having a lower end coupled to the axially inner end and an upper end carrying a spring mount, and the middle portion being formed to include an interior region containing the inner shell, and
a torsion spring coupled to the handle and to the spring mount carried on the upper end of the inner shell.

18. A cap for use in the filler neck of a tank, the cap comprising
a handle,
an O-ring sealing gasket,
a closure body including an axially outer flange coupled to the handle, an axially inner end carrying the O-ring sealing gasket, and a middle portion positioned to lie between the axially outer flange and the axially inner end, and
a dust shield ring coupled to the middle portion of the closure body and positioned to lie between the axially outer flange and the O-ring sealing gasket.

19. The cap of claim 18, wherein the dust shield ring is made of an elastic compressible material.

20. The cap of claim 19, wherein the closure body is made of a plastics material and the dust shield ring is made of spring steel.

21. The cap of claim 18, wherein the middle portion is formed to include an annular channel and the dust shield ring includes a radially inner annular mounting portion positioned to lie in the annular channel of the middle portion and a radially outer annular closure portion around the radially inner mounting portion.

22. The cap of claim 21, wherein the middle portion is formed to include a first annular flange and a second annular flange, the second annular flange is positioned to lie between the axially outer flange and the first annular flange, and the second annular flange is positioned to lie in axially spaced-apart relation to the first annular flange to define the annular channel formed in the middle portion therebetween.

23. The cap of claim 21, wherein the dust shield ring further includes an annular section having a curved cross section interconnecting and lying between the radially inner annular mounting portion and the radially outer annular closure portion.

24. The cap of claim 21, wherein the dust shield ring is made of stainless steel.

25. The cap of claim 24, wherein the dust shield ring further includes an annular section having a curved cross section interconnecting and lying between the radially inner annular mounting portion and the radially outer annular closure portion.

26. A cap for use in the filler neck of a tank, the cap comprising a handle, an O-ring sealing gasket, and a closure body including an axially outer flange coupled to the handle, an axially inner end carrying the O-ring sealing gasket, a middle portion positioned to lie between the axially outer flange and the axially inner end, and closure retainer apparatus appended to the middle portion and configured to engage the filler neck to block removal of the closure body from the filler neck upon installation of the cap in the filler neck, wherein the closure retainer apparatus includes a pair of retaining lugs and each of the retaining lugs is a helical annular member.

27. A cap for use in the filler neck of a tank, the cap comprising a handle, an O-ring sealing gasket, a closure body including an axially outer flange coupled to the handle, an axially inner end carrying the O-ring sealing gasket, a middle portion positioned to lie between the axially outer flange and the axially inner end, and closure retainer apparatus appended to the middle portion and configured to engage the filler neck to block removal of the closure body from the filler neck upon installation of the cap in the filler neck, the middle portion being integrally appended to each of the axially outer flange and the axially inner end, the middle portion including an axially upper section positioned to lie between the axially outer flange and the closure retainer apparatus, and a dust shield ring coupled to the axially upper section of the middle portion.

28. The cap of claim 27, wherein the axially upper section is formed to include an annular channel and the dust shield ring includes a radially inner mounting portion positioned to lie in the annular channel and a radially outer annular closure portion around the radially inner mounting portion.

29. A cap for use in the filler neck of a tank, the cap comprising a handle, an O-ring sealing gasket, and a closure body including an axially outer flange coupled to the handle, an axially inner end carrying the O-ring sealing gasket, an inner shell having a lower end coupled to the axially inner end and an upper end carrying a spring mount, a middle portion positioned to lie between the axially outer flange and the axially inner end, the middle portion being integrally appended to each of the axially outer flange and the axially inner end, and closure retainer apparatus appended to the middle portion and configured to engage the filler neck to block removal of the closure body from the filler neck upon installation of the cap in the filler neck, the middle portion being formed to include an interior region containing the inner shell, and a torsion spring coupled to the handle and to the spring mount carried on the upper end of the inner shell.

\* \* \* \* \*